(12) United States Patent
Ruan et al.

(10) Patent No.: US 12,482,113 B2
(45) Date of Patent: Nov. 25, 2025

(54) INFERRING USER POSE USING OPTICAL DATA

(71) Applicant: META PLATFORMS TECHNOLOGIES, LLC, Menlo Park, CA (US)

(72) Inventors: Haowen Ruan, Menlo Park, CA (US); Francesco Marsili, Foster City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 716 days.

(21) Appl. No.: 17/739,877

(22) Filed: May 9, 2022

(65) Prior Publication Data
US 2022/0405946 A1    Dec. 22, 2022

Related U.S. Application Data

(60) Provisional application No. 63/212,365, filed on Jun. 18, 2021.

(51) Int. Cl.
| | |
|---|---|
| *G06V 40/20* | (2022.01) |
| *G06F 3/01* | (2006.01) |
| *G06T 7/246* | (2017.01) |
| *G06V 10/77* | (2022.01) |

(52) U.S. Cl.
CPC ............. *G06T 7/251* (2017.01); *G06F 3/017* (2013.01); *G06V 10/7715* (2022.01); *G06V 40/28* (2022.01); *G06T 2207/30196* (2013.01)

(58) Field of Classification Search
CPC .......... G06T 7/251; G06T 2207/30196; G06V 10/7715; G06V 40/28
See application file for complete search history.

(56) References Cited

U.S. PATENT DOCUMENTS

| | | | | |
|---|---|---|---|---|
| 10,867,159 | B2 * | 12/2020 | Setlak | G06V 40/1365 |
| 12,230,052 | B1 * | 2/2025 | Kviatkovsky | G06V 10/82 |
| 2014/0085625 | A1 * | 3/2014 | Ahmed | G06F 3/017 |
| | | | | 356/73 |

(Continued)

OTHER PUBLICATIONS

International Search Report and Written Opinion for International Application No. PCT/US2022/034112, mailed Sep. 28, 2022, 9 pages.

(Continued)

*Primary Examiner* — Shaghayegh Azima
(74) *Attorney, Agent, or Firm* — Greenberg Traurig, LLP

(57) ABSTRACT

A tracking device monitors a portion of a user's skin to infer a pose or gesture made by a body part of a user that engages the portion of the user's skin as the pose or gesture is made. For example, the tracking device monitors a portion of skin on a user's forearm to infer a pose or gesture made by the user's hand. The tracking device may include an illumination source that illuminates the portion of the user's skin. An optical sensor of the tracking device may capture images of the illuminated portion of skin. A controller of the tracking device infers a pose or gesture of the body part based in part on a model (e.g., a machine-learned model) and the captured images. The model may map various configurations of the user's skin to different poses or gestures of the body part.

18 Claims, 7 Drawing Sheets

(56) References Cited

U.S. PATENT DOCUMENTS

| | | | | |
|---|---|---|---|---|
| 2015/0310263 A1* | 10/2015 | Zhang | ............ | H04N 23/51 |
| | | | | 382/103 |
| 2017/0031453 A1* | 2/2017 | Presura | ............ | A61B 5/02438 |
| 2017/0102775 A1* | 4/2017 | Keller | ............ | G06F 3/017 |
| 2019/0101991 A1* | 4/2019 | Brennan | ............ | G06V 40/28 |
| 2019/0278973 A1* | 9/2019 | Setlak | ............ | G06V 40/1365 |
| 2021/0081646 A1* | 3/2021 | Setlak | ............ | G06V 40/1318 |
| 2021/0204023 A1* | 7/2021 | Knox | ............ | H04N 21/42201 |

OTHER PUBLICATIONS

Nissler C., et al., "Optical Myography: Detecting Finger Movements by Looking at the Forearm," Frontiers in Neurorobotics, Apr. 11, 2016, vol. 10, No. 3, pp. 1-10.

International Preliminary Report on Patentability for International Application No. PCT/US2022/034112, mailed Dec. 28, 2023, 8 pages.

* cited by examiner

INFERRING USER POSE USING OPTICAL DATA

CROSS-REFERENCE TO RELATED APPLICATIONS

This application claims the benefit of U.S. Provisional Application No. 63/212,365, filed Jun. 18, 2021, which is incorporated by reference in its entirety.

FIELD OF THE INVENTION

This disclosure relates generally to user interfaces, and more specifically to inferring user pose using optical data (e.g., images).

BACKGROUND

In some use cases, users of virtual reality (VR) or augmented reality (AR) systems may not have access to traditional user input devices (e.g., controllers, keyboards, etc.). In these instances, a gesture based user interface may be ideal. One promising modality to enable this function is surface electromyography (sEMG), where the electrical activity produced by the muscles of the forearm are measured to infer the hand gestures. However, this modality requires a tight contact between the electrodes and the skin and highly depends on the quality of the contact, which is challenging to be used in an all-day wearable device. In addition, this modality is very sensitive to electromagnetic interference that commonly exists in a typical user environment.

SUMMARY

Embodiments pertain to a tracking device for inferring poses or gestures of a user. The tracking device can use surface optical myography to infer a pose or gesture. The tracking device includes an illumination source, an optical sensor, and a controller. The tracking device may be integrated into a wearable garment (e.g., worn over the portion of skin monitored to infer a pose or gesture). The inferred poses or gestures may be mapped to instructions for the tracking device or another device communicatively coupled to the tracking device. For example, the user's smartphone is communicatively coupled to the tracking device and the user pinches their thumb and index fingers together to instruct the smartphone to decline an incoming phone call. The tracking device can infer the user's pinching gesture (e.g., based on images taken of skin at the user's palm as the fingers pinch together) and instruct the smartphone to decline the incoming phone call. To determine which pose or gesture a user is making, the tracking device may apply a model to patterns or displacement of features of the skin determined from images of the skin, where the patterns or displacement of skin features are mapped to different poses or gestures. Thus, the tracking device can use the model to infer a likely pose or gesture being made by the user.

In one embodiment, a tracking device monitors a portion of a user's skin to infer a pose or gesture made by a body part of a user that engages the portion of the user's skin as the pose or gesture is made. For example, the tracking device monitors a portion of skin on a user's forearm to infer a pose or gesture made by the user's hand. The tracking device may include an illumination source that illuminates the portion of the user's skin. An optical sensor of the tracking device may capture images of the illuminated portion of skin. A controller of the tracking device infers a pose or gesture of the body part based in part on a model (e.g., a machine-learned model) and the captured images. The model may map various configurations of the user's skin to different poses or gestures of the body part.

In another embodiment, a method includes illuminating a portion of a skin of a user. The illuminated portion of skin may move in response to movement of a body part of the user, and the illuminated portion of skin is smaller than the body part. Images of the illuminated portion of skin are captured and a pose of the body part is inferred based in part on a model and the captured images. The model may map various configurations of skin of the user to different poses of the body part.

In yet another embodiment, a non-transitory computer-readable storage medium stores instructions that, when executed by a processor of a tracking device, cause the tracking device to illuminate a portion of skin of a user and capture images of the illuminated portion of skin. The illuminated portion of skin may move in response to movement of a body part of the user. The illuminated portion of skin may be smaller than the body part. The instructions further include instructions that cause the tracking infer a pose of the body based in part on a model and the captured images. The model may map various configurations of skin of the user to different poses of the body part.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A tracking device monitors a portion of a user's skin to infer a pose or gesture made by a body part of a user that engages the portion of the user's skin as the pose or gesture is made. The tracking device may illuminate and capture images of the portion of skin. The tracking device may apply a model to the captured images to infer a pose or gesture being made by the body part. The tracking device may be a wearable device or incorporated into a garment or accessory (e.g., that is worn over a portion of the body being monitored to determine gestures or poses that the user is making). The tracking device may be coupled to another device (e.g., an artificial reality headset) and provide instructions to the other device based on the gestures or poses inferred. For example, a user may form a peace sign, or a V shape with their fingers, the tracking device infers that the user is making that pose based on images captured of a portion of skin at the back of the user's hand, and the tracking device instructs an artificial reality headset with an instruction that is mapped to the peace sign (e.g., to resume playback of the media displayed to the user via the headset).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1:
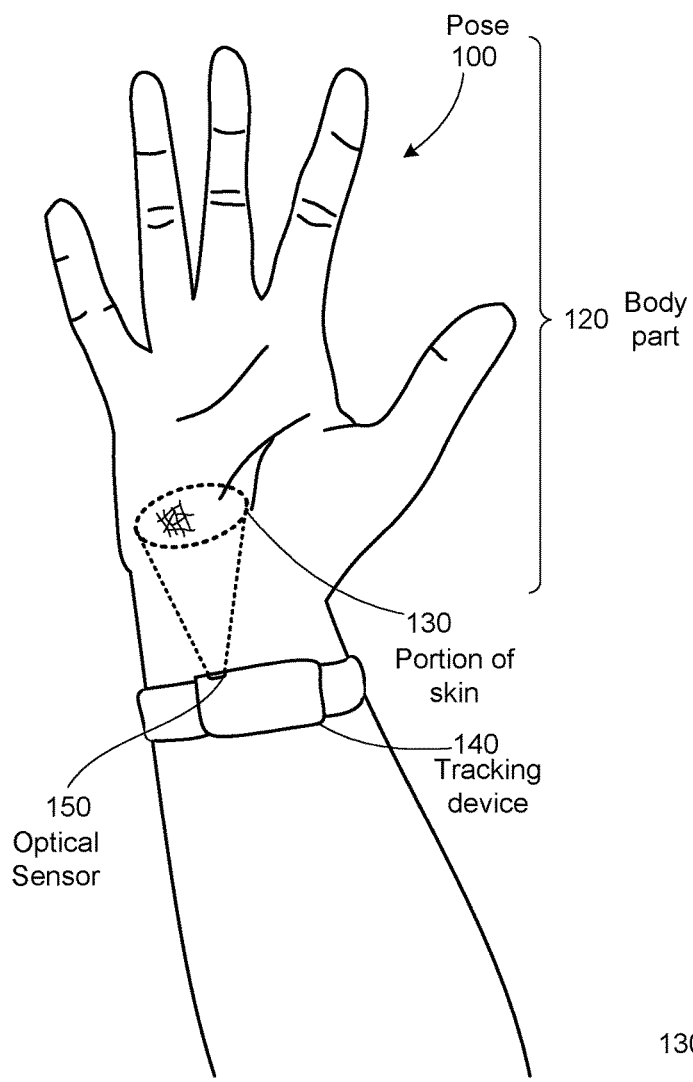
FIG. 1 shows a tracking device monitoring a portion of skin of a body part that is forming a first pose, in accordance with one embodiment.

FIG. 1 shows a tracking device 140 monitoring a portion of skin 130 of a body part 120 that is forming a pose 100, in accordance with one embodiment. The pose 100 is a five, where the opens their palm and outstretches each of their fingers. The body part 120 forming this pose is the user's hand. Examples of poses made using a hand include a five, a fist, a pinch, an OK sign, a peace sign, thumbs up, thumbs down, or any other suitable configuration of the hand. The portion of skin 130 monitored by the tracking device 140 is skin over the base of the little finger (e.g., the hypothenar eminence) of the body part 120. The tracking device 140 may monitor any suitable portion of the user's skin that engages when making the pose 100. For example, the tracking device 140 may monitor alternatively direct the optical sensor 150 to monitor the skin at the user's wrist as they make the pose 100 (e.g., adjusting focal points of one or more lenses or redirecting lenses of the optical sensor 150 to capture the wrist instead of the hypothenar eminence). The images of the portion of skin 130 may be used by the tracking device 140 to determine that the user's body part 120 is making the pose 100. That is, without capturing an image of the pose 100 in its entirety, the tracking device 140 infers from the portion of skin 130, which is engaged as the user is making the pose 100, that the user is indeed making the pose 100. The tracking device 140 may use surface optical myography to infer a pose of the user. The tracking device and mechanisms for making such an inference is described with respect to FIG. 5.

The tracking device 140 can be a wearable device or integrated into a wearable device, garment, or accessory worn over a portion of the body. Examples of a wearable garment include a glove, ring, wristband, sleeve, pants, shirt, or any suitable wearable item. The tracking device 140 includes an optical sensor 150 for capturing images of the portion of skin 130. The tracking device 140 may be communicatively coupled to another device (e.g., an augmented reality (AR) headset). In some embodiments, the tracking device 140 illuminates the portion of skin 130, which moves in response to the user moving their body part 120. The portion of skin 130 is smaller than the body part 120. The tracking device 140 captures images of the illuminated portion of skin 130 (e.g., using the optical sensor 150). Although a single optical sensor 150 is depicted, the tracking device 140 may include multiple optical sensors 150 for capturing images of the portion of skin 130 or different portions of the user's skin (e.g., portions of the user's inner forearm, wrist, fingers, etc.). The tracking device 140 can infer a pose of the body part 120 based in part on a model and captured images. The model may map various configurations of the portion of skin 130 to different poses of the body. One example of a second pose that can be inferred through another configuration of the portion of skin 130 is shown in FIG. 2.

Figure 2:
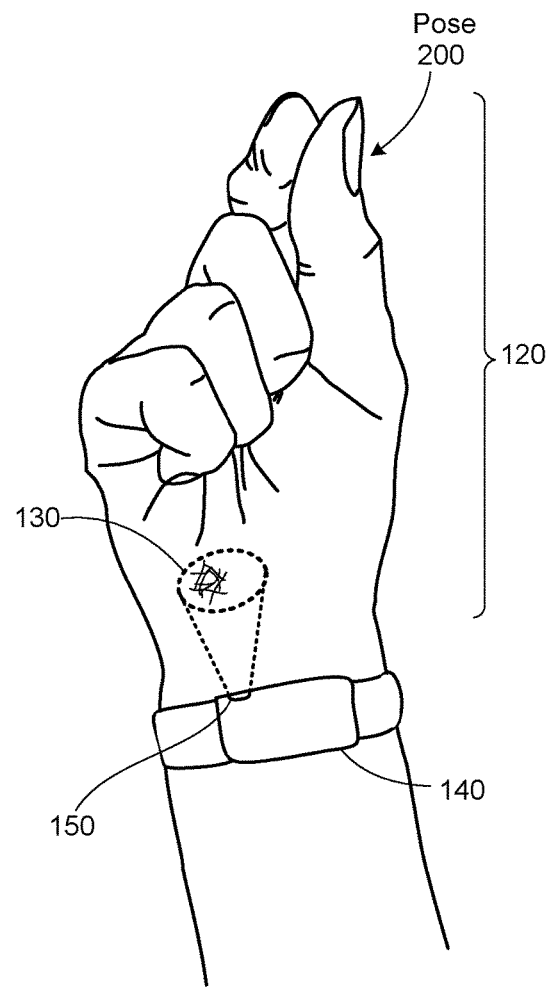
FIG. 2 shows the tracking device monitoring the portion of skin of the body part of FIG. 1 that is forming a second pose, in accordance with one embodiment.

FIG. 2 shows the tracking device 140 monitoring the portion of skin 130 of the body part 120 of FIG. 1 that is forming a pose 200, in accordance with one embodiment. The pose 200 is a pinching pose formed by the user's thumb and index fingers. The tracking device 140 may infer the pose 200 is being made by the body part 120 in a similar manner to how the pose 100 is inferred. For example, a model may be applied to images of the portion of skin 130 when the user is making the poses 100 and 200, where the model is a machine-learned trained using previously captured images of the portion of the skin 130 that are labeled according to a corresponding pose being made. In some embodiments, the tracking device 140 may infer a pose using a previously determined pose. For example, the tracking device 140 compares skin displacement at the portion of skin 130, as captured in images by the optical sensor 150, to historically captured images depicting a similar a pattern of movement from the pose 100 to the pose 200.

Figure 3:
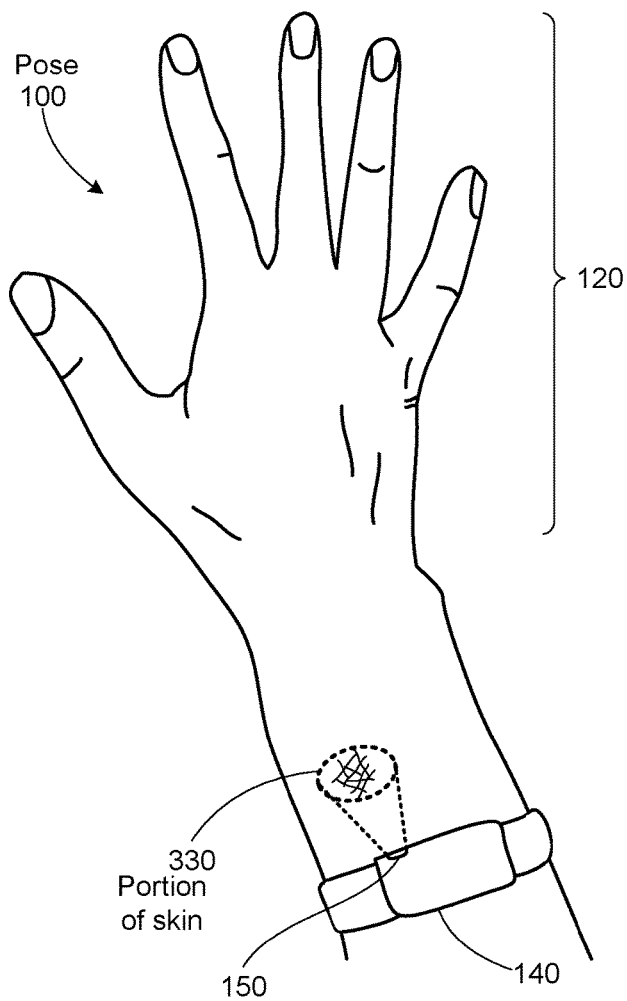
FIG. 3 shows the tracking device monitoring a different portion of skin of the body part of that is forming the first pose of FIG. 1, in accordance with one embodiment.

FIG. 3 shows the tracking device 140 monitoring a portion of skin 330 of the body part 120 of FIG. 1 that is forming the pose 100, in accordance with one embodiment. While the user is forming the same pose 100 as depicted in FIG. 1, the five pose, tracking device 140 is worn such that the optical sensor 150 is capturing the portion of skin 330 rather than the portion of skin 130. The tracking device 140 may monitor the portion of skin 130, the portion of the skin 330, any other suitable portion of skin that engages as the user is forming the pose 100, or some combination thereof. Using images of the portion of the skin 330 depicting skin features, the tracking device 140 may infer that the pose 100 is being made. The term "skin features" may refer generally to a measurable behavior or appearance of the skin that represents a movement or position of the skin, such as patterns of the skin (e.g., the appearance of lines in the skin at a moment in time), displacement of the skin (e.g., the change in appearance of the lines in the skin over movement), birthmarks, or pigmentation. The skin features at the portion of skin 330 may be different from the skin features at the portion of skin 130 resulting from the body part 120 making the pose 100. The tracking device 140 may use historical images of various portions of the user's skin captured by optical sensors when forming the pose 100 to determine whether a given portion of the user's skin maps to the pose 100. Alternatively or additionally, the tracking device 140 may filter the set of historical images used based on the portion of the user's skin captured by the optical sensor 150 (e.g., based on the configuration in which the user is wearing the tracking device 140). The tracking device 140 may, prior to inferring which pose the user is making, prompt the user to specify the configuration in which the user is wearing the tracking device 140. For example, the tracking device 140 displays, at a user interface of the tracking device 140 or a client device communicatively coupled to the tracking device 140, a question and provides user input elements for the user to respond to the question (e.g., "Are you wearing the device on your right arm?" and "Are you wearing the device on the inside of that arm?" with user interface buttons for "Yes" and "No"). In some embodiments, the tracking device 140 may automatically determine where the user is wearing the tracking device 140 and subsequently modify the mechanisms through which it infers poses (e.g., selecting a particular machine-learned model trained on images taken at the determined location of the tracking device 140 to improve the accuracy of the predictions over using a machine-learned model that is trained using images of various locations of the user's body). Such functions of the tracking device are further discussed in the description of FIG. 5.

Figure 4:
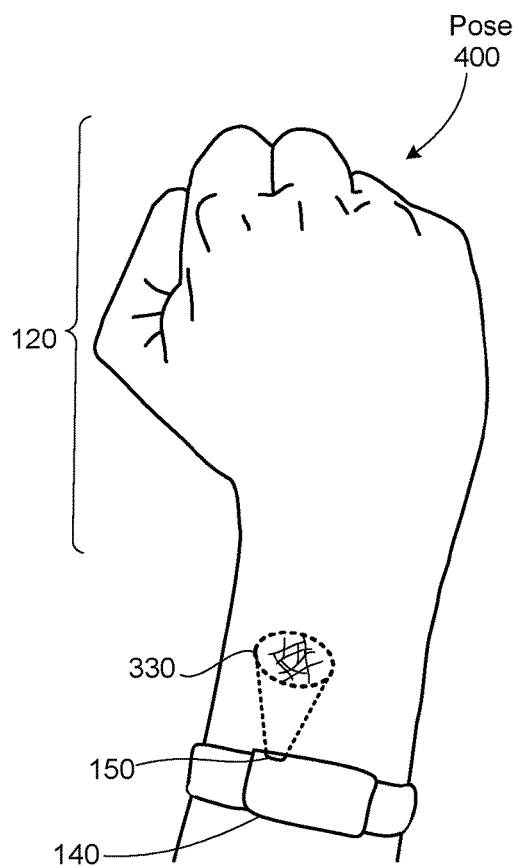
FIG. 4 shows the tracking device monitoring the portion of skin of FIG. 3 of the body part that is forming a third pose, in accordance with one embodiment.

FIG. 4 shows the tracking device 140 monitoring the portion of skin 330 of FIG. 3 of the body part 120 that is forming a pose 400, in accordance with one embodiment. The pose 400 is a first formed by the body part 120. The tracking device 140 may infer the pose 400 is being made by the body part 120 in a similar or different manner to how the poses 100 and 200 are inferred. In some embodiments, the tracking device 140 determines which inference mechanism produces a relatively more accurate pose inference for a given position of the tracking device 140. For example, the tracking device 140 determines that applying an optical flow model is more accurate than applying a machine-learned model when the tracking device 140 is worn at the user's outer forearm and capturing images from that location. Accordingly, the tracking device 140 may use an optical flow model to infer whether the user is making the pose 400 in the embodiment depicted in FIG. 4 while using a machine-learned to infer the poses 100 and 200 when the tracking device is worn in the inner forearm. Such functions of the tracking device are further discussed in the description of FIG. 5.

Although a hand is depicted in FIGS. 1-4 as the body part making poses for the tracking device 140 to infer, the tracking device 140 may infer poses from various body parts based on portions of skin engaged when making poses using those body parts. For example, the tracking device may be worn on a pair of shoes (e.g., sandals) or other wearable item over a foot (e.g., a medical cast) and monitor for poses made by a user's toes (e.g., lifting a particular toe, curling a toe, stretching out toes, etc.) based on images of the top of the user's forefoot. Furthermore, although different poses are depicted in FIGS. 1-4, the tracking device 140 may additionally or alternatively infer gestures made by the user (e.g., using the body part 120). For example, in addition to inferring the five pose 100 depicted in FIG. 1, the tracking device 140 may be configured to infer a waving hand.

Figure 5:
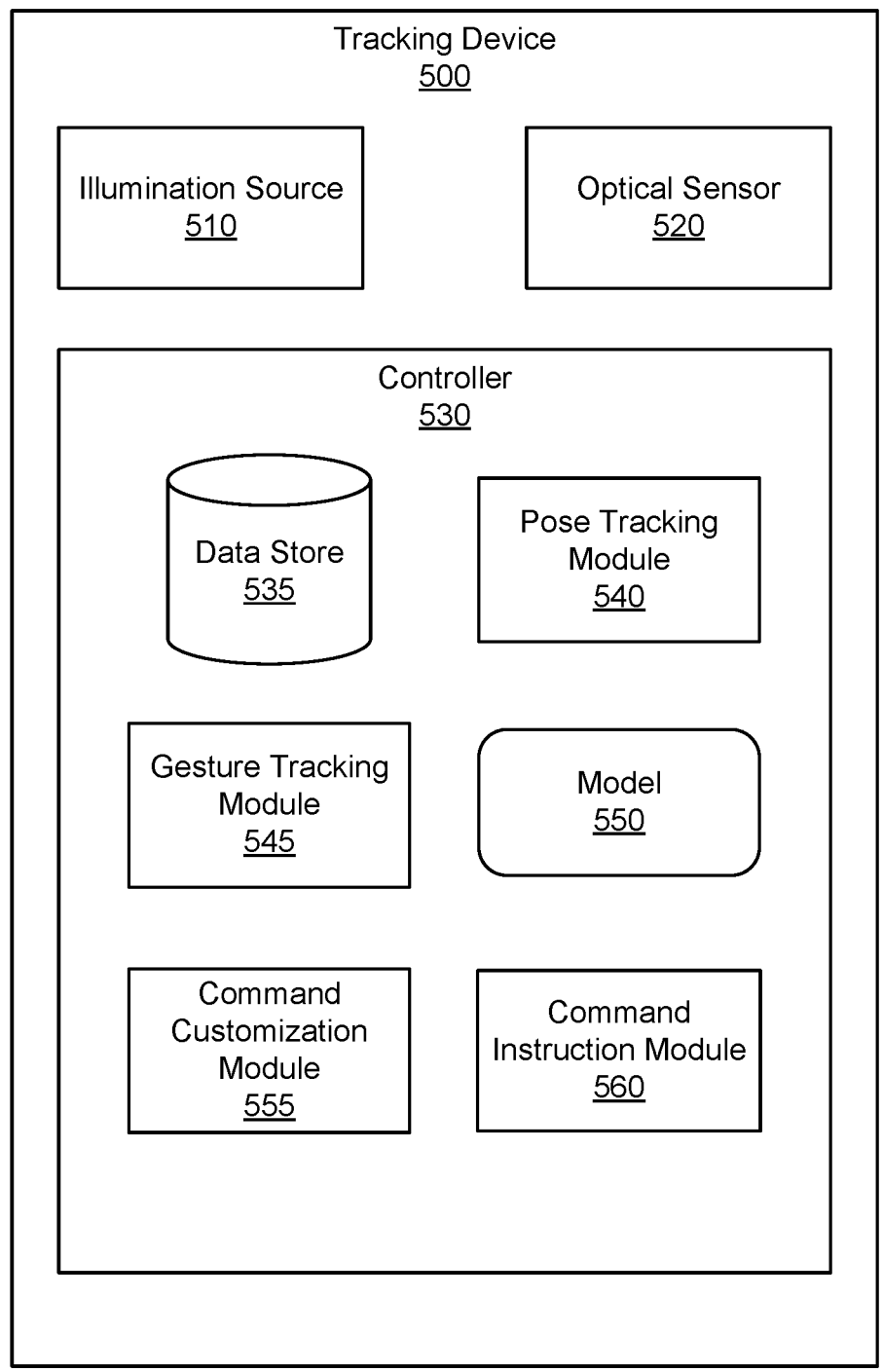
FIG. 5 is a block diagram of a tracking device, in accordance with one embodiment.

FIG. 5 is a block diagram of a tracking device 500, in accordance with one embodiment. The tracking device 150 in FIGS. 1-4 may be an embodiment of the tracking device 500. The tracking device 500 infers a pose or gesture made by a user's body part by monitoring a portion of the user's skin that is engaged while making the pose or gesture. In the embodiment of FIG. 5, the tracking device 500 includes an illumination source 510, an optical sensor 520, and a controller 530. Some embodiments of the tracking device 500 have different components than those described here. For example, in some embodiments, a tracking device may omit an illumination source (e.g., using ambient light as an illumination source). Similarly, in some cases, functions can be distributed among the components in a different manner than is described here.

The illumination source 510 illuminates a portion of a user's skin. The portion of skin may be referred to as a region of interest (ROI). Light from the illumination source 510 is reflected from the illuminated skin and collected by the optical sensor 520. The portion of the user's skin illuminated by the illumination source 510 is engaged as the user makes a gesture or a pose with a body part. For example, the illumination source 510 illuminates a portion of the user's right forearm, which engages as the user makes gestures such as a first and a five to control a device. The illumination source 510 enables the optical sensor 520 to capture physical properties of the surface of the user's skin such as motion of the surface of the skin and depth information. Because the contour of the skin that is not a perfectly flat surface (e.g., even unblemished skin naturally has a non-flat texture from pores and skin lines), skin depth is a physical property. As a user moves their body, skin stretches and folds, altering the skin's depth over an area illuminated by the illumination source 510.

The illumination source 510 can be different types of light sources. Example light sources include a light emitting diode (LED), a laser diode, any suitable light for illuminating skin, or a combination thereof. The illumination source 510 may have a narrow- or intermediate-bandwidth and may provide pattern illumination or point illumination depending on the type of illumination source and optical sensor. In some embodiments, the illumination source 510 provides visible light or non-visible light (e.g., near infrared or infrared light), depending on the spectral sensitivity of the optical sensor 520 of the tracking device 500 and other factors, such as reflectivity, depth penetration, skin absorption, scattering, or other manner in which light interacts with skin.

The illumination source 510 may illuminate a portion of skin that is part of or distinct from the body part tracked by the tracking device 500. In one example of illuminating skin that is part of the body part posing and making gestures tracked by the tracking device 500, the illumination source 510 illuminates the skin behind the user's hand or the skin at the user's calm to track gestures or poses made by the user's hand. In another example of illuminating skin that is part of the body part, the illumination source 510 illuminates a portion of the user's finger's distal phalange as the user's fingers are making gestures such as a pinch or crossing their finger with another. In this example, the tracking device 500 may be integrated into a ring. In one example of illuminating skin that is distinct from the body part tracked by the tracking device 500, the illumination source 510 illuminates the skin at the user's wrist to track gestures or poses made by the user's hand or fingers.

The illumination source 510 may include optical elements for modifying, filtering, or guiding light directed at a portion of a user's skin. Example optical elements include an aperture, a lens, a mirror, a filter, a prism, a polarizer, grating, any suitable optical element affecting illumination and light collection, or a combination thereof. For example, the illumination source 510 includes a beam expander with prisms or lenses for expanding a light beam to illuminate an area. The tracking device 500 may include two or more illumination sources. The illumination sources may be located at different areas on the tracking device 500. The illumination sources may be illuminating the same portion of a user's skin, different portions of the user's skin, or a combination thereof. In an example where illumination sources illuminate different portions of the user's skin, images of the different portions of the user's skin may be used to track different poses, different gestures, a single pose, or a single gesture.

In some embodiments, the illumination source 510 may illuminate portions of a user's skin using patterned light, or structured light, such as a series of dots or bars. Patterned light may be used by the tracking device 500 to identify a change in one or more skin features as the user moves (e.g., identifying skin displacement). For example, the dots or bars of the patterned light may be used as fixed reference points or areas to compare against changing locations of skin lines as the user moves their skin. Illumination without a pattern may be referred to as flood illumination (e.g., illuminating an entire portion of the skin). In some embodiments, the illumination source 510 may provide multiple types of illumination, such as both flood illumination and patterned illumination. In some embodiments, the device 500 may select a type of illumination for the illumination source 510 to emit. The selection may be based on the portion of skin targeted for illumination, the level accuracy with which pose or gesture inferences are being determined, the location of the device 500 on the user's body, any suitable parameter impacting or impacted by a type of light emission, or a combination thereof. For example, to increase a signal to noise ratio of the images of the skin captured to infer a pose, the tracking device 500 may select to use flood illumination in addition to or as an alternative to patterned illumination.

The optical sensor 520 captures images of a portion of a user's skin illuminated by the illumination source 510. The optical sensor 520 may include one or more camera, one or more video cameras, any suitable device capable of capturing images of a user's skin, or a combination thereof. The optical sensor 520 converts light into electronic signals. The optical sensor 520 may measure changes in light, such as changes related to optical properties of the light (e.g., intensity, wavelength, or spectral distribution). Additionally, the optical sensor 520 may detect a bend or slight change in direction of light. The optical sensor 520 may measure other optical properties of light such as phase, coherence, interference patterns, or polarization. The optical sensor 520 may generate signals using measured optical properties of light. For example, the optical sensor 520 may employ polarizing filters, implementing polarized light sensing, to obtain signals representative of a portion of skin's anisotropy (e.g., refraction and absorption). The spectral sensitivity of the optical sensor 520 can be in the visible band (approximately 380 nanometers (nm) to 750 nm), in the infrared (IR) band (approximately 750 nm to 2.5 micrometers ($\mu$m), in the ultraviolet band (10 nm to 380 nm), some other portion of the electromagnetic spectrum, or a combination thereof.

The optical sensor 520 may be configured to discern skin features of a portion of a user's skin within an ROI and discern skin features with dimensions of at least 5 For example, the optical sensor 520 may be configured to discern skin features that are 40 $\mu$m in width (e.g., width of lines of a skin pattern). The optical sensor 520 may measure depth information of the skin. The depth information can describe a surface profile of the user's skin. In this manner, the optical sensor 520 may monitor how the surface profile of the user's skin changes (e.g., as the user gestures or poses with a body part that engages the monitored portion of skin). The optical sensor 520 may have various resolutions and frame rates to provide different tracking smoothness or precision. In some embodiments, resolution of the optical sensor 520 is approximately one kilohertz (kHz) or a higher frame rate, allowing for rapid imaging so sequential images overlap, simplifying determination of position information from the images. In some embodiments, the optical sensor 520 is monochromatic.

In some embodiments, the optical sensor 520 may perform processing in addition to imaging a portion of a user's skin. For example, the optical sensor 520 may construct a raster from the images captured by a camera of the optical sensor 520 or additional optical sensors at the tracking device 500 or at other tracking devices communicatively coupled to the tracking device 500 (e.g., an optical sensor in a smart watch and another optical sensor in a smart ring). The optical sensor 520 may include hardware that allows for corresponding optical flow information to be derived from the raster. Optical flow describes a pattern of motions of an ROI or relative motion between the optical sensor 520 and the ROI. Examples of such hardware suitable for performing imaging and processing algorithms to compute optical flow include pixel hardware design. In some embodiments, the optical sensor 520 allows a tracking device to capture more than two degrees of freedom in position. Examples of more than two degrees of freedom include translational motion (e.g., forward/back, up/down, left/right) and rotational motion (e.g., pitch, yaw, roll). For example, the optical sensor 520 may measure a pixel width or shape of an illumination cone to determine more than two degrees of freedom in position.

The optical sensor 520 may include one or more optical elements for providing, transporting, guiding, filtering, or modifying light from the illumination source 510 to the tracking device 500. Example optical elements include an aperture, a lens, a mirror, a filter, a prism, a polarizer, any suitable optical element affecting illumination and light collection, or a combination thereof. The optical sensor 520 may include combinations of different optical elements. For example, the optical sensor 520 may include a collimator with mirrors or lenses for aligning light from the illumination source 510 in a specific direction. In some embodiments, the optical sensor 520 includes imaging lenses for focusing reflected lights from the illumination portion of the user's skin to the tracking device 500. The optical sensor 520 may include circuitry that converts the collected light into an electrical signal flowing as current within the circuitry (e.g., the optical sensor 520 includes photoresistors or any suitable photosensor). The tracking device 500 may include a power supply and a power controller for the illumination source 510 and the optical sensor 520. In some embodiments, the tracking device 500 includes two or more optical sensors to capture light from the portion(s) of skin illuminated by the illumination source 510 or multiple illumination sources.

The controller 530 controls operation of the tracking device 500. In the embodiment of FIG. 5, the controller 530 includes a data store 535, a pose tracking module 540, a gesture tracking module 545, a model 550, a command customization module 555, and a command instruction module 560. Some embodiments of the controller 530 have different components than those described here. Similarly, functions can be distributed among the components in different manners than described here. For example, some functions of the controller 530 may be performed external to the tracking device 500. For example, the pose tracking functions are performed at a computing device communicatively coupled to the tracking device 500. An example of an environment of computing devices communicatively coupled to the tracking device is described in reference to FIG. 9.

The data store 535 stores data enabling the tracking device 500 to infer poses or gestures. The data store 535 may store training data for training or creating a model that is applied to captured images to infer the pose or gesture (e.g., the model 550). The data store 535 may store images captured of the user's skin at one or more locations when a pose or gesture is made. The images may be labeled according to the pose, gesture, location at which the tracking device 500 is worn when the image is taken, or the portion of skin depicted in the images. The data store 535 may also store context data associated with captured images (e.g., the time, location, weather, activity performed by the user, or devices communicatively coupled to the tracking device 500 when the image is taken). In some embodiments, the data store 535 additionally or alternatively stores data enabling the tracking device 500 to execute a command associated with the pose or gesture (e.g., sending instructions to a smartphone to decline a call in response to the user making a pinching gesture). For example, the data store 535 includes a data structure mapping poses or gesture to commands for one or more devices, which may include the tracking device 500.

The pose tracking module 540 infers a pose of a user's body part using one or more images captured by the optical sensor 520. In making this inference, the pose tracking module 540 may determine a likelihood that a user's body part is forming a particular pose. A pose can be a position a user makes with a body part. Example poses a user makes with a hand include a fist, a five, crossed fingers, or an "OK." In some embodiments, a user may customize a pose using the command customization module 555. The pose tracking module 540 may use a model 550 to infer the pose. The model 550 may map various configurations of the user's skin to different poses of a user's body part. As a user is making a gesture or pose with a particular body part (e.g., their hand), their skin may engage in one or more configurations (e.g., the skin on the user's palm may stretch as the user makes a five gesture). Each gesture or pose can engage different configurations of the user's skin. The model 550 may be a machine-learned model, a statistical model, a correlation model, an optical flow algorithm, a computer vision algorithm (e.g., Scale-Invariant Feature Transform (SIFT), or a combination thereof. The model 550 may be applied to one or more images captured by the optical sensor 520. The output of the model 550 may be a likelihood that a user's body part is forming a particular pose.

The pose tracking module 540 may infer the pose using one image captured by the optical sensor 520. The pose tracking module 540 may determine the similarity between a captured image and one or more previously captured images of the user's portion of skin captured when making a particular pose. The previously captured images may be stored in the data store 535. The pose tracking module 540 may determine similarities in skin features, such as similarities in skin texture patterns. For example, the pose tracking module 540 may determine a spatial frequency of the patterns depicted in captured images and compare with a spatial frequency of patterns depicted in previously captured images. In some embodiments, the pose tracking module 540 may determine distortions in skin patterns that map to respective poses. A distortion within a skin pattern may also be characterized and tracked as a separate skin pattern to determine a user is likely making a particular pose.

In one example of inferring pose from a single image, the model 550 may be a machine-learned model that is trained using labeled images of a portion of the user's skin, where the label indicates which particular pose the user is making with a body part or indicates the absence or presence of the user making the particular pose (e.g., "pinch" or "not a pinch"). The pose tracking module 540 may apply the machine-learned model to the single image to determine which pose is associated with an image of the portion of the user's skin. The machine-learned model may output a confidence score corresponding to a likelihood that the user's body part is forming the pose. The pose tracking module 540 may compare the determined confidence score to a threshold score to infer whether or not the user is making the pose. In another example of inferring pose from a single image, the model 550 may include an edge detection algorithm and a cross correlation algorithm. The edge detection algorithm may be applied to the captured image before applying a cross correlation algorithm. While edge detection is described in this example, any suitable image processing algorithm for reducing sensitivity to noise (e.g., color variation due to lighting differences between historical and current images of the portion of skin) may be applied before a cross correlation algorithm.

The pose tracking module 540 may infer the pose using multiple images captured by the optical sensor 520. The pose tracking module 540 may use each of the multiple images directly or derive information from the images to infer a particular pose made by the user's body part. In an example of using the multiple images directly, the pose tracking module 540 may compare each image to one or more historical images using mechanisms described previously with respect to inferring pose using a single image. The pose tracking module 540 may weigh the determinations from each of the individual image comparisons. For example, the pose tracking module 540 may weigh the determination from an image taken with higher resolution greater than the determination from an image taken with lower resolution. The pose tracking module 540 may then use a weighted score to determine the likelihood that a user is making a particular pose with a body part. The pose tracking module 504 can then compare the determined likelihood to a threshold likelihood to determine whether or not the user is making the pose.

The pose tracking module 540 may derive information from the images to infer the particular pose made by the user's body part. Information derived from the images can include displacement of features of the captured portion of the user's skin over time (e.g., over consecutively captured images). Displacement of the features can correspond to the movement of skin as the user moves into making the particular pose. For example, the user moves their thumb and index fingers to touch as they prepare to make an "OK" sign with their hand. This movement is also referred to as a gesture and is discussed with respect to the gesture tracking module 545. In this way, a pose may be inferred using an inferred gesture, where the sequences of poses are made before reaching a desired pose (e.g., chronologically preceding the desired pose). The pose tracking module 540 may apply the model 550 to the captured images, where the model 550 may map displacements of the skin determined from the captured images to a corresponding pose of the body part. For example, the model 550 may use a SIFT algorithm to extract and match features of the images under image scaling and rotation conditions to determine the displacement of a particular matched feature over time. The model 550 may further include optical flow. The pose tracking module 540 may apply the optical flow to the determined displacements over time to determine a likelihood that the pattern of movement corresponds to a particular pose. An example of tracking displacement of skin features is further described with respect to FIG. 6.

In some embodiments, the pose tracking module 540 may determine context information to infer a next pose. Context information can describe an environment in which a pose is made by the user. Examples of context information include a location, a date, a time, an activity being performed by the user, device(s) used by the user or communicatively coupled to the tracking device 500, biometric measures, inertial measurement unit (IMU) data, or any other suitable information describing the user or the environment in which a pose is made.

In one example of using context information to infer a pose, the pose tracking module 540 receives IMU data and biometric data (e.g., the user's heart rate) from IMUs and a heart rate sensor of the tracking device 500, where the IMU and biometric data are received at substantially the same time (e.g., the data is received within thirty seconds of one another) as images of an illuminated portion of a user's skin are received. The pose tracking module 540 may create a feature vector including the IMU data, biometric data, and skin feature displacements derived from the captured images. The pose tracking module 540 may apply a machine-learned model to the feature vector, where the machine-learned model may be trained using feature vectors including historical IMU, biometric, and skin displacement data that are labeled indicating whether a particular pose was performed as a result of the skin displacement within the historical context. This example may apply to an embodiment where the user is exercising. The user's heart rate and IMU data can be indicative of their exercising, and the machine-learned model has been trained using previously captured images of a portion of the back of their hand as they cross the user's fingers to instruct a client device to skip to the next song playing from the client device. In some embodiments, the pose tracking module 540 may use IMU data to distinguish between two poses whose primary difference is an orientation of the body part (e.g., thumbs up and a thumbs down). For example, the pose tracking module 540 may apply IMU data representing the turn of a user's wrist as they turn a thumbs up into a thumbs down and along with one or more images of the skin forming the thumbs up to a model (e.g., the model 550) to infer that the user is making a thumbs down pose.

In a second example of using context information to infer a pose, the pose tracking module 540 determines that the pose tracking device 500 is coupled to an augmented reality headset (e.g., using a hardware identifier associated with the headset). The pose tracking module 540 can receive an image captured by the optical sensor 520 while the tracking device 500 is coupled to the headset. The pose tracking module 540 may create a feature vector representing the tracking device's connection to the headset and image data of the captured image. The pose tracking module 540 may apply a machine-learned model to the feature vector, where the machine-learned model may be trained using similar feature vectors from historical data that are labeled to indicate whether a particular pose was performed when the historical data was measured. This example may apply to an embodiment where the user is gaming and makes a gesture to silence a notification (e.g., of an incoming call) to focus on their game.

The pose tracking module 540 may use a previously determined pose to infer a pose. The pose tracking module 540 may store a series of previously determined poses (e.g., stored in the data store 535). When determining a subsequent pose, the pose tracking module 540 may look back on the latest or N last (e.g., three last) determined poses. The pose tracking module 540 may use the commands associated with the previously determined poses to infer a next pose. In one example of using previously determined poses to infer a pose, the last pose determined by the pose tracking module 540 is a pair of crossed fingers commanding a coupled client device to answer an incoming phone call. The pose tracking module 540 accesses this determination when inferring, using captured images of a portion of the user's skin as the user makes a "V" or peace sign with their fingers to end the call, that the skin displacement in the captured images is associated with the peace sign. The pose tracking module 540 may apply a statistical model to the last determined pose and the skin displacement derived from the captured images, where the output of the statistical model indicates that the user is making a peace sign with a high degree of confidence.

The gesture tracking module 545 may infer a gesture using multiple images captured by the optical sensor 520. The gesture tracking module 545 may use each of the multiple images directly or derive information from the images to infer a particular gesture made by the user's body part. In an example of using the multiple images directly, the gesture tracking module 545 may compare each image to one or more historical images using mechanisms described previously with respect to inferring pose using a single image. A gesture may be a sequence of poses of a body part over time. Accordingly, the gesture tracking module 545 may determine that the multiple images map to a sequence of poses corresponding to a gesture. The gesture tracking module 545 may use the model 550 to infer a pose of a body part from a captured image of a portion of the user's skin. In some embodiments, the gesture tracking module 545 may apply the model 550 to multiple images of the user's skin to infer the gesture. For example, the model 550 may include a neural network configured to infer a particular pose from a sequence of images input to the neural network. The gesture tracking module 545 may maintain templates for various gestures, where each template includes a sequence of historical images of poses made when performing the respective gesture of the template. These templates may be stored in the data store 535.

The gesture tracking module 545 may derive information from the images to infer the particular gesture made by the user's body part. Information derived from the images can include displacement of features of the captured portion of the user's skin over time (e.g., over consecutively captured images). Displacement of the features can correspond to the movement of skin as the user moves into making the particular gesture. The gesture tracking module 545 may apply the model 550 to the captured images, where the model 550 may map displacements of the skin determined from the captured images to a corresponding gesture of the body part.

The pose tracking module 540 or the gesture tracking module 545 may partition a captured image. Each partition may be analyzed by the modules to track skin features in each partition. The tracked features in each partition may be input into a model (e.g., the model 550) to infer a user's pose or gesture. Partitioning is further described with reference to FIG. 6.

In some embodiments, the pose tracking module 540 or the gesture tracking module 545 may automatically determine where the user is wearing the tracking device 500. After matching one or more captured images to a particular pose or gesture, the pose tracking module 540 or the gesture tracking module 545 may determine the portion of skin depicted in the historical image(s) matching the currently captured images. For example, the historical images may be stored in a data structure in the data store 535 with metadata identifying which portion of skin is depicted in the historical images (e.g., an image includes metadata or is labeled specifying that the image depicts the user's inner forearm of their right arm). The pose tracking module 540 or the gesture tracking module 545 may then determine where the tracking device 500 is worn based on the determined portion of skin. For example, after determining that the captured images match historical images of the user's left palm, the pose tracking module 540 may determine that the tracking device 500 is being worn on the inside of the user's left arm. The controller 530 may maintain a mapping of locations where the tracking device 500 can be worn and the different portions of skin that can be captured by the optical sensor 520 when the tracking device 500 is worn at each of the different locations. This mapping may be stored in the data store 535. The pose tracking module 540 or the gesture tracking module 545 may access this mapping when determining where the tracking device 500 is located.

In some embodiments, the pose tracking module 540 or the gesture tracking module 545 determines which inference mechanism produces the most accurate pose inference for a given position of the tracking device 500. In one example of using different inference mechanisms, a machine-learned model may be applied to portions of the skin when the tracking device 500 is worn at the inner forearm, as depicted in FIGS. 1 and 2, and an optical flow model may be applied when the tracking device 500 is worn at the outer forearm, as depicted in FIGS. 3 and 4. The tracking device 500 may determine, using user feedback, which inference mechanism to use (e.g., provides the most accuracy). For example, if a user has previously provided feedback indicating dissatisfaction with a machine-learned model for inferring poses when the tracking device 500 is worn at the outer forearm and feedback indicating satisfaction with an optical flow model for inferring poses when the tracking device 500 is worn at the outer forearm, the tracking device 500 may determine to use the optical flow model rather than use the machine-learned model in response to determining that the tracking device 500 is being worn at the outer forearm.

The model 550 can map positions or displacements of a user's skin, as determined from the captured images, to corresponding poses or gestures of a body part of the user. The model may be a machine-learned model, a statistical model, a correlation model, an optical flow algorithm, a computer vision algorithm, or a combination thereof. A machine-learned model of the model 550 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof. The model 550 may be created by the controller 530. For example, the pose tracking module 540 creates a statistical model to infer a pose, where the statistical model is created using previously captured images of a portion of a user's skin (e.g., stored in the data store 535) and a corresponding gesture or pose made while the images were captured. In another example, the gesture tracking module 545 can train a machine-learned model to identify a gesture from a skin feature displacement data or a series of images of a portion of a user's skin. The gesture tracking module 545 may additionally retrain the machine-learned model based on user feedback of the gesture inferences.

In some embodiments, the model 550 may be an optical flow model of skin displacement. The optical flow model can define patterns of motion of a portion of the user's skin relative to the optical sensor 520. Each of the patterns may map to a different pose of a body part of the user. For example, the optical sensor 520 captures images of the user's inner forearm as the user is pinching their thumb and index fingers together (e.g., to perform a pinch gesture or a pose including the thumb and index fingers pinched together). This may be done during, for example, a recalibration or command customization of a pinch pose or gesture (e.g., by the command customization module 555). The optical flow model can define a pattern of motion of the user's inner forearm skin relative to the optical sensor 520 as the user is pinching their fingers together. Using this defined pattern, the optical flow model can be applied to subsequently captured images of the user's inner forearm to infer whether the user is making the pinch pose or gesture.

In some embodiments, the model 550 may be a skin feature model that maps skin features to different poses of a user's body part. The skin features can include surface patterns of a portion of a user's skin. A user's skin features may change as they move a body part to make a particular gesture or move the body part into a particular pose. The surface patterns may rotate, stretch, or otherwise change in orientation or appearance. The skin feature model may apply a computer vision algorithm (e.g., SIFT) to images of a user's skin to extract and match features in surface patterns of the user's skin to previously captured images when the user was making a particular gesture or pose.

Figure 7:
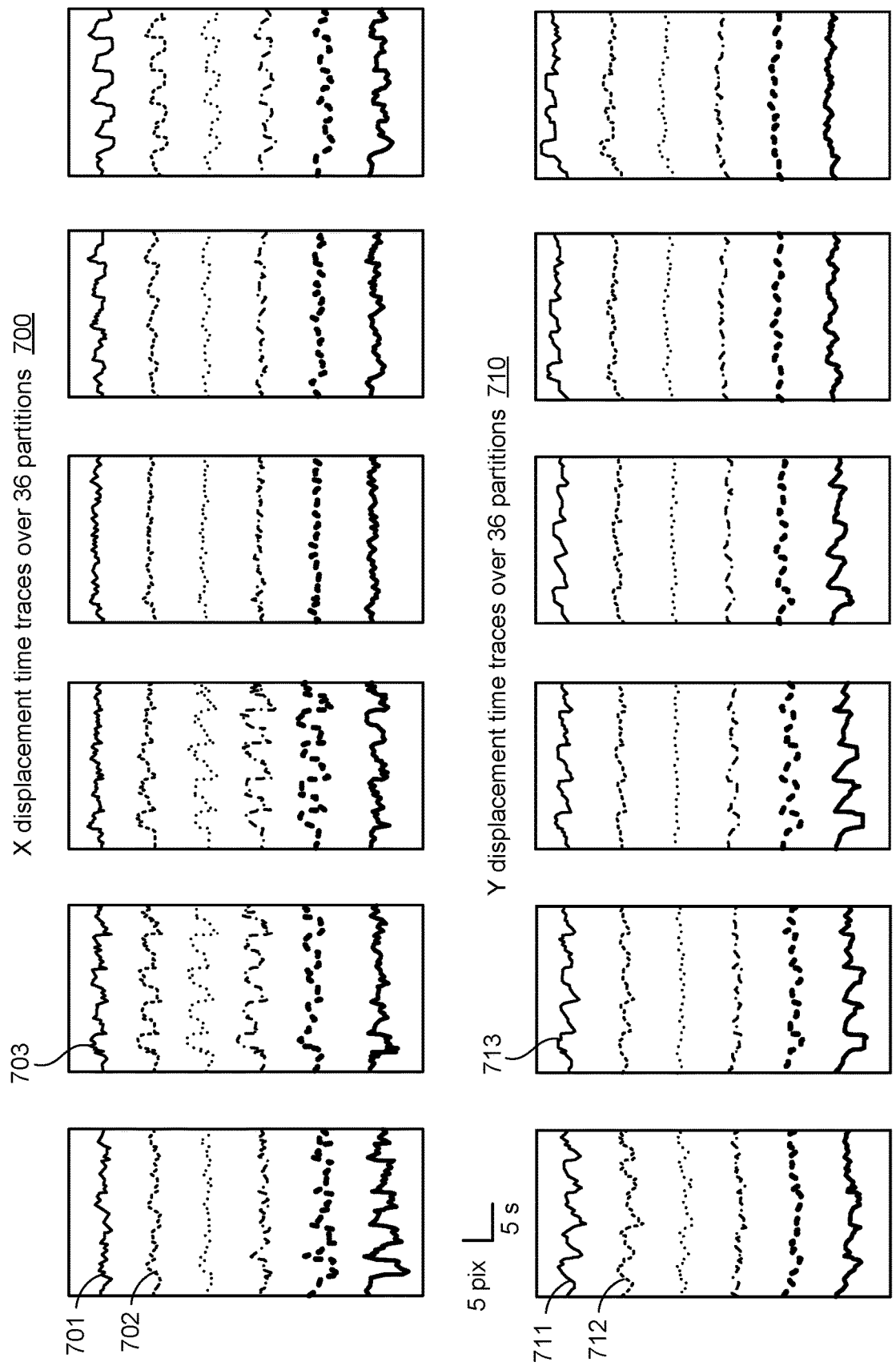
FIG. 7 shows displacement data for the partitions of FIG. 6, in accordance with one embodiment.

The controller 530 can maintain one or more machine-learned models (e.g., the model 550) for determining a likely pose or gesture made by a user's body part while engaging a portion of skin that is illuminated by the illumination source 510. The controller 530 may train the machine-learned models to determine different poses or gestures using different training data sets. The data sets may correspond to different portions of the user's skin, different poses, different gestures, or a combination thereof. For example, the gesture tracking module 545 may use a first data set of images captured by the optical sensor 520 of the user's wrist while the user is making a first to train a first machine-learned model and use a second data set of images captured of the user's inner forearm while the user is pinching their thumb and index fingers together to train a second machine-learned model. The trained machine-learned models can be used to determine the likelihood of the respect poses or gestures being made. The machine-learned models may be configured to receive, as input, images captured by the optical sensor 520 or data derived from the captured images (e.g., skin displacement data as shown in FIG. 7) and output a likely pose or gesture being made by a body part of the user (e.g., the user's hand). The machine-learned models may also output a confidence score corresponding to the determined pose or gesture.

In some embodiments, the pose tracking module 540 or the gesture tracking module 545 may determine which of the machine-learned models to apply to one or more captured images. For example, the controller 530 may determine a mapping for illumination sources or optical sensors to particular portions of the user's skin, where the illumination sources and optical sensors may be collocated with the tracking device 500 or at other tracking devices worn by the user and communicatively coupled to the tracking device 500. The mapping may specify that a particular illumination source or optical sensor corresponds to a particular portion of the user's skin (e.g., the optical sensor 520 is used to capture images of a portion of the user's inner forearm). The controller 530 may prompt the user to confirm which portions of their skin that particular optical sensors or illumination sources are being used to capture. For example, although not depicted, the tracking device 500 may include a display (e.g., a display of a smartwatch) for displaying a graphical user interface (GUI) with input elements to confirm which portions of the user's skin are being captured. In another example, the tracking device 500 may be communicatively coupled to a user's client device (e.g., a smartphone) where data from the tracking device 500 is provided to a software application executed on the client device, which includes a display for providing a GUI for the user to interact with the tracking device 500 (e.g., confirming which portion of their skin is being captured by the optical sensor 520).

The controller 530 may train a machine-learned model in multiple stages. Although the controller 530 will be referred to in the description of training the machine-learned model, particular modules such as the pose tracking module 540 or the gesture tracking module 545 may be used to train the machine-learned model. In a first stage, the controller 530 may use generalized image data capturing a particular portion of skin from various users while performing the same gesture (e.g., images of different user's wrist as they are making a pinching gesture). The generalized image data may be labeled to indicate the images correspond to a pinching gesture. Alternatively or additionally, the generalized data may include the skin displacement data derived from the images (e.g., using the SIFT algorithm to determine the x- and y-pixel displacement of a matched feature in a series of images). This labeled data may serve as a first training set that the controller 530 may use to train the machine-learned model to identify a pinching gesture from images of a user's wrist.

In another example of a first stage of training the machine-learned model, the controller 530 may use image data collected during an initial command customization (e.g., as facilitated by the command customization module 555) to train the machine learning model. The controller 530 may label the image data as corresponding to a user's customized gesture or pose or as corresponding to a known gesture or pose that the user requests to calibrate (e.g., the user instructs the tracking device 500 to capture images of their distal phalanx as they make a pinching gesture). The controller 530 creates a first training set based on the labeled image data and trains a machine learning model to infer the user is creating the customized or recalibrated pose or gesture.

In a second stage of training, the controller 530 uses user-specific image data, as opposed to image data from a generalized population, collected by the optical sensor 520 or displacement data derived from the user-specific images. The controller 530 creates a second training set based on previously determined gestures or poses and the user-specific image data. The controller 530 may label the user-specific image data or displacement data with the determined gesture or pose in response to receiving user feedback indicating the accuracy of the inference made. For example, if the pose tracking module 540 receives user feedback indicating that the module 540 incorrectly inferred that the user was making a five pose, the pose tracking module 540 may label the captured image data with a binary value indicating that the image data does not correspond to a five pose. In another example, if the gesture tracking module 545 correctly infers that the user is making a pinching gesture using skin displacement data, the gesture tracking module 545 may label the captured images used to make that inference with a label indicating that the displacement data does indeed correct to a pinching gesture. The controller 530 may receive user feedback from the user directly (e.g., via a client device communicatively coupled to the tracking device or through a user interface at the tracking device 500 such as a button or a display to provide feedback) or indirectly (e.g., the tracking device 500 determines the inference was incorrect in response to determining that the user cancels or changes commands manually within a threshold amount of time from an incorrect command set into motion by an incorrect inference of a gesture or pose). The controller 530 may retrain the machine-learned model using the second training set (e.g., such that the machine-learned model is further customized to the user's skin profile or displacement patterns when making certain gestures or poses).

The command customization module 555 generates customized commands corresponding to gestures or poses. A user may create a custom command, custom gesture, custom pose, or combination thereof. The tracking device 500 may include a user input interface (e.g., a display, keypad, button, etc.) for displaying instructions for the user to generate their customization and provide user input to instruct the command customization module 555. For example, the command customization module 555 prompts the user to select among options to customize a gesture or pose for a corresponding command for silencing a device (e.g., a smartphone). The user may provide a user input selecting gesture and in response, the command customization module 555 prompts the user to move their body part according to their desired gesture. The user may move their hand to make a pinching gesture between their thumb, middle, and ring fingers while keeping their index and little fingers relatively extended. The command customization module 555 may prompt the illumination source to illuminate a portion of the user's skin and command the optical sensor 520 to capture the illuminated portion as the user is performing the custom gesture. The command customization module 555 may then store the captured images or data derived from the images into the data store 535. The stored data may also be labeled with an identifier associated with the custom gesture (e.g., for training a machine-learned model, such as the model 550, to identify the custom gesture).

In some embodiments, the command customization module 555 may recalibrate existing commands or customized commands and their corresponding gestures or poses. For example, the command customization module 555 may provide a user input element enabling the user to request to recalibrate an existing pose or gesture. The command customization module 555 may provide for display (e.g., at a client device communicatively coupled to the tracking device 500 if the tracking device lacks a display) a list of available gestures or poses to recalibrate. In response to receiving a selection of a particular pose or gesture, the command customization module 555 may prompt the user to move their body part according to their desired pose or gesture. The command customization module 555 may prompt the illumination source to illuminate a portion of the user's skin and command the optical sensor 520 to capture the illuminated portion as the user is performing the pose or gesture. The command customization module 555 may then store the captured images or data derived from the images into the data store 535. The stored data may also be labeled with an identifier associated with the recalibrated pose or gesture (e.g., for retraining a machine-learned model, such as the model 550, to identify the pose or gesture). In some embodiments, after storing the data for recalibration, the command customization module 555 may delete from storage the previously captured image data for the pose or gesture (e.g., to increase available storage space).

The command instruction module 560 instructs a device to perform a command according to the inferred gesture or pose. The command instruction module 560 may maintain a mapping of gestures and/or poses to particular commands for devices. Examples of commands for devices can include silencing the device, adjusting the volume of a device, adjusting the brightness of a device, waking up a device, powering off a device, disabling network communications for a device (e.g., enabling airplane mode), changing a musical track, playing or pausing multimedia, any suitable instructions for controlling a device, or a combination thereof. The command instruction module 560 may instruct one or more devices. For example, a first gesture may be mapped to an instruction for the tracking device 500 to change a battery state to a "power saving" mode and a second gesture may be mapped to an instruction for a smartphone communicatively coupled to the tracking device 500 to take a picture. In some embodiments, the commands may be for controlling the operation of software applications executed on the device. For example, a gesture of closing a hand or a pose of a closed hand (e.g., meeting the thumb with the four other fingers) may correspond to a scrolling command on a webpage of an Internet browsing application (e.g., scrolling down).

Figure 6:
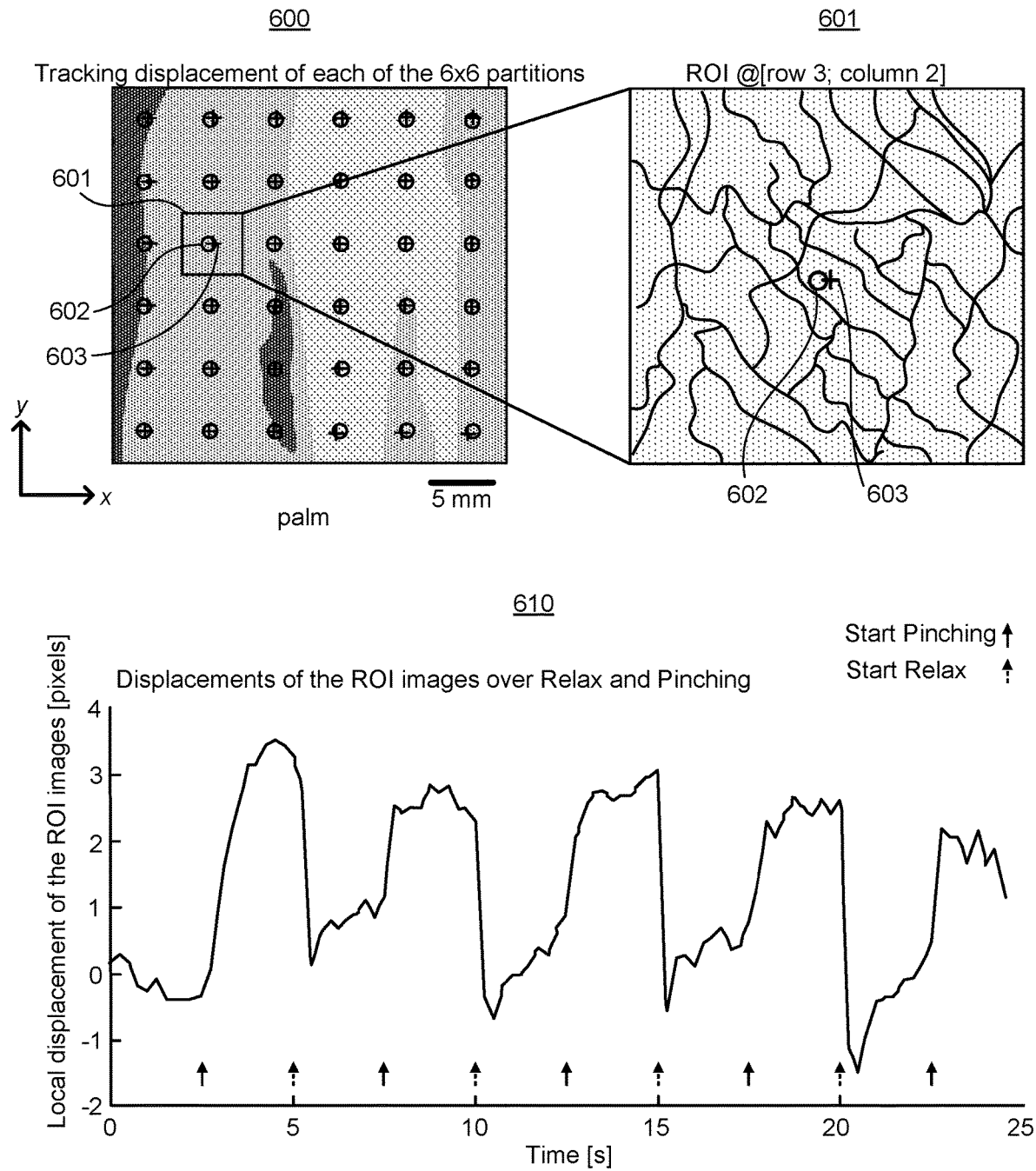
FIG. 6 depicts skin displacement data of a palm tracked by a tracking device, in accordance with one embodiment.

FIG. 6 depicts skin displacement data of a palm tracked by a tracking device, in accordance with one embodiment. The skin displacement data is represented by image 600 depicting the skin at the palm and displacement data 610 derived from images of the palm's skin over time (e.g., including the image 600). The image 600 is a magnified view depicting a portion of the skin of the user's palm. The shading in image 600 corresponds to the shading of surface of the user's skin. The image 600 is partitioned into thirty six partitions, including a partition 601. Each partition includes a centroid of the partition, indicated by circles, and a location of a matched feature of the skin within the partition, indicated by crosses. The partition 601 includes the centroid 602 and the matched feature 603. A tracking device (e.g., the tracking device 140 or 500) may capture the image 600, partition the image, and determine locations of matched features of the skin within each partition. When initializing the partitions using an initial photo of a portion of the user's skin, the tracking device may identify a feature within each partition. The tracking device may then identify the matching feature in subsequently captured images of the portion of the user's skin.

The tracking device may derive displacement data from the captured images, including the displacement data 610. The displacement may be the difference in x or y pixels between the matching feature (e.g., the pixel at the center of the cross) and the centroid of the partition (e.g., the pixel at the center of the circle). The tracking device may determine the displacement over time for one or more of the partitions determined from the images. The displacement data 610 tracks the displacement of the skin at the user's palm as the user pinches and relaxes their fingers. In particular, the displacement data 610 tracks the x-displacement measured in the partition 601 as the user makes a pinching gesture and relaxes their fingers away from the pinch pose. The tracking device may apply a model (e.g., the model 550) to the displacement data 610 to infer that the user is making a pinching gesture. After determining that the user is making a pinching gesture, the tracking device may instruct a client device that is communicatively coupled to the tracking device to perform a command mapped to the pinching gesture (e.g., pause multimedia content playing from the client device).

FIG. 7 shows displacement data for the partitions of FIG. 6, in accordance with one embodiment. A tracking device (e.g., the tracking device 140 or 500) derives the displacement data shown in datasets 700 and 710 from images of a portion of the user's skin at a hand (e.g., the palm of the hand) while the user is pinching and relaxing the fingers of the hand. A displacement time trace may map the x or y displacement of a matched feature (e.g., a matched feature 603) from a centroid (e.g., the centroid 602) of a partition over a period of time.

In some embodiments, the tracking device may identify one or more features of the portion of a user's skin, determine the displacement of the one or more features over a sequence of images (e.g., determining displacement using feature matching of multiple features within a partition), and assigning the displacement to the centroid of the partition to show the displacement of that partition. For example, referring to FIG. 6, the tracking device may assign the matched feature 603 as an updated centroid for the partition 601, replacing the centroid 602. The displacement between the matched feature 602 and the centroid 602 may include an x and a y pixel displacement (e.g., positive fifteen pixels in the x-axis and negative thirty pixels in the y-axis) that are logged as a value for an X displacement time trace and a Y displacement time trace, respectively.

The dataset 700 includes the x-pixel displacement of thirty six partitions (e.g., as shown in the image 600) over time, including the x-pixel displacement data 701 for a first partition (e.g., at the first column and first row of the image 600), the x-pixel displacement data 702 for a second partition (e.g., at the first column and second row of the image 600), and the x-pixel displacement data 703 for a seventh partition (e.g., at the second column and first row of the image 600). The dataset 710 includes the y-pixel displacement of the thirty six partitions over time. The dataset 710 includes the y-pixel displacement data 711 for the first partition, the y-pixel displacement data 712 for the second partition, and the y-pixel displacement data 713 for the seventh partition. The tracking device may apply a model (e.g., the model 550) to one or more of the partitions' displacement data in the x direction, y direction, or both.

Figure 8:
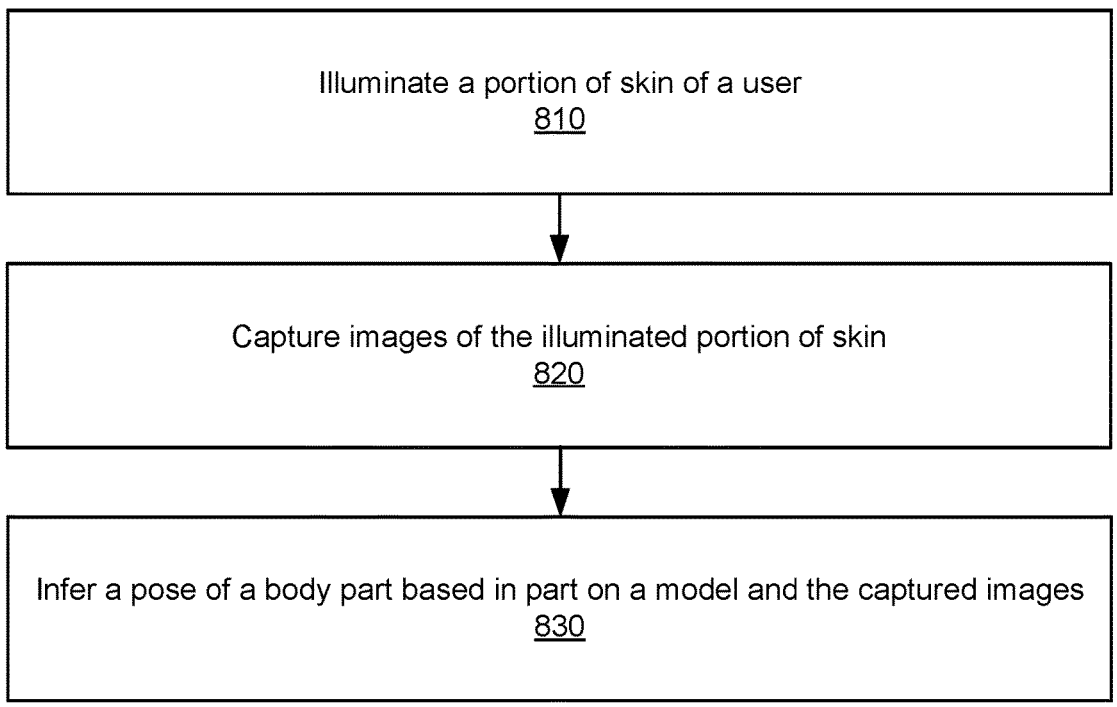
FIG. 8 is a flowchart of a process of inferring a pose, in accordance with one or more embodiments.

FIG. 8 is a flowchart of a process 800 of inferring a pose, in accordance with one or more embodiments. The process 800 may be performed by components of a tracking device (e.g., the tracking device 500). Other entities may perform some or all of the steps in FIG. 8 in other embodiments. Embodiments may include different and/or additional steps, or perform the steps in different orders.

The tracking device illuminates 810 a portion of the skin of a user. An illumination source of the tracking device may illuminate 810 the portion of the skin. For example, an LED of the tracking device illuminates a portion of skin at the user's inner forearm.

The tracking device captures 820 images of the illuminated portion of the skin. An optical sensor of the tracking device may capture 820 images of the illuminated portion of the skin. Following the previous example, a camera of the tracking device captures images of the portion of skin at the user's inner forearm that is illuminated by the LED.

The tracking device infers 830 a pose of a body part based in part on a model and the captured images. A controller of the tracking device may infer 830 the pose. Following the previous example, the controller infers that a user is gesturing an OK sign using the captured images and a model. The model may use captured images and optionally, context information or a pose previously determined by the controller to infer that the user is gesturing the OK sign. The model may be a machine-learned model that classifies poses depicted in images, determines a likelihood that a particular pose is depicted in the images, or a combination thereof. In one example where the model is a machine-learned model, the controller generates a feature vector representing context information that the user is currently located at a park (e.g., using global position system (GPS) coordinates provided by a user's smartphone that is communicatively coupled to the tracking device or as determined by GPS circuitry at the tracking device) and representing the captured images. The machine-learned model may be trained using feature vectors of previously captured images and the user's location where the images were captured, where the feature vectors are labeled according to a gesture or pose performed by the user (e.g., previous instances that the user has made an OK sign to instruct the tracking device to start recording a workout in progress). The controller, using the machine-learned model, may infer that the user is making the OK sign at the park.

In another example of the process 800 for inferring a pose, the tracking device infers that a user has made a first by using images captured of the user's wrist. As the user makes the fist, the tendons protrude on their wrist and as the tendons protrude, skin features such as movement of lines over the tendons can be tracked through images captured by an optical sensor of the tracking device. The tracking device may be a smartwatch that includes an illumination source that illuminates 810 the wrist of the user (e.g., the inner wrist). For example, the illumination source may use a patterned light with multiple bars or dots to illuminate the inner wrist. An optical sensor of the smartwatch captures 820 images of the illuminated inner wrist, including images of the tendons protruding as the user makes a fist. The tracking device may then infer 830 that the user is making a first based on a model (e.g., an optical flow algorithm) and the captured images.

In yet another example of the process 800 for inferring a pose, the tracking device infers that a user is closing their hand or making a pinching gesture to command a scrollbar on a webpage to scroll down. As the user closes their right thumb closer to their other fingers, the tracking device infers that the user is making the pinching gesture based on images captured of the back of the user's right hand. Skin patterns can close as the user pinches and the same patterns may stretch as the user opens their hand, releasing the pinching gesture. Although the process 800 includes illuminating 810 a portion of the user's skin, the tracking device may infer the pinching and opening gestures without illuminating the skin (e.g., using the ambient light of the user's environment). The tracking device captures 820 images of the back of the user's right hand and infers 830 that the user is pinching their fingers based on the captured images. In some embodiments, the tracking device may use the captured images to determine an amount by which the user is pinching or opening their hand. For example, the tracking device may map different poses to different stages of the user opening or pinching their hand. Based on the detection of these different poses indicating an amount by which the user is opening or closing their hand, the tracking device may determine corresponding commands for controlling a device or a software application executed on a device. For example, the tracking device may infer that the user has pinched their hand such that their thumb and index finger are separated by two centimeters (i.e., a first pose) and determine a corresponding command to scroll down at a webpage that the user is currently browsing on their device at a rate of three hundred milliseconds to scroll down one thousand pixels. As the user closes their fingers closer, the tracking device infers that the user is making a second pose where their thumb and index finger are separated by one centimeter. The tracking device may then determine a corresponding command to scroll down at the webpage at a rate of five hundred milliseconds per one thousand pixels, increasing the speed of the scrolling as the user closes their fingers together further. Similarly, the tracking device may increase the speed for scrolling up at the webpage.

Figure 9:
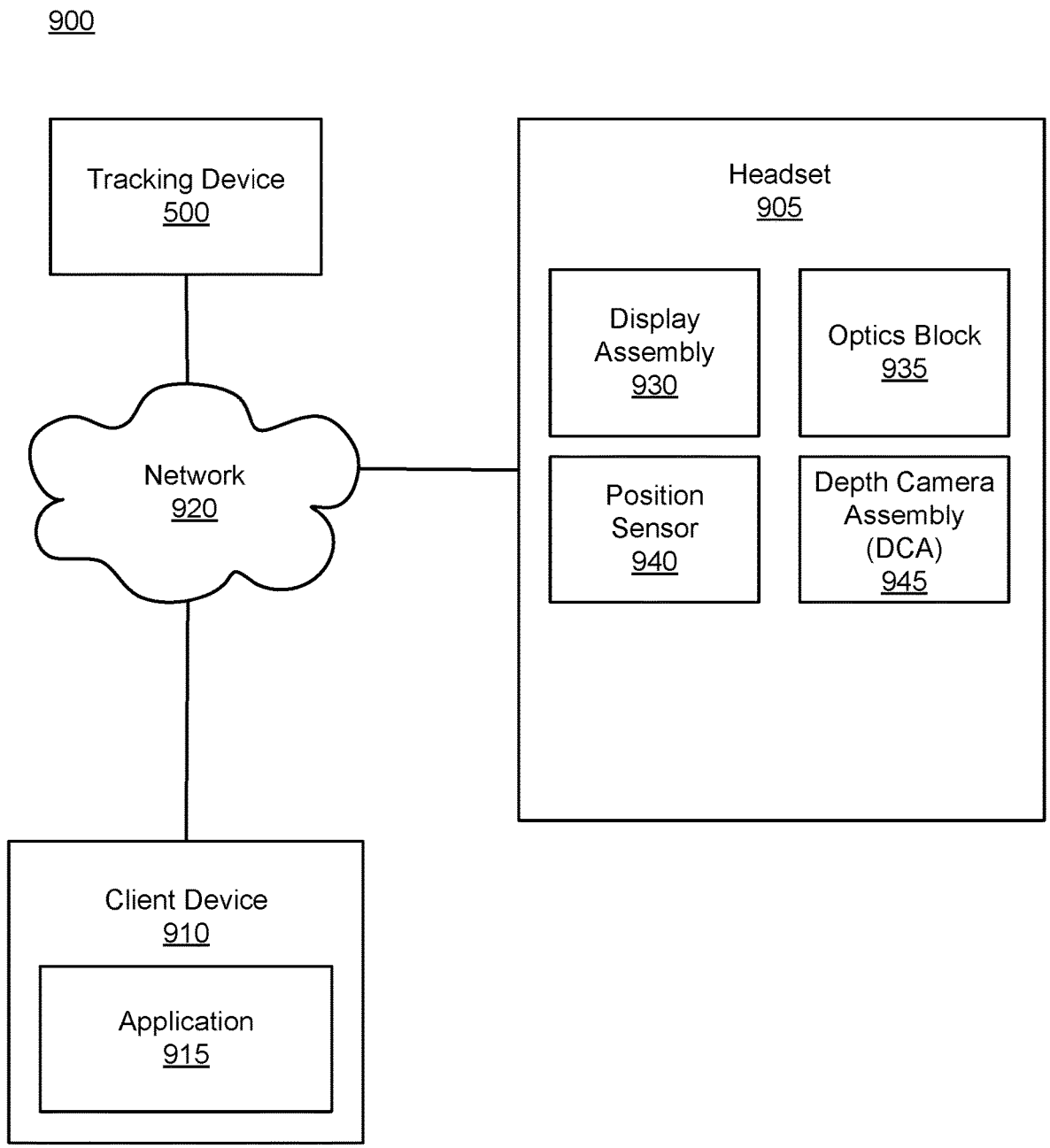
FIG. 9 is a system that includes a headset, in accordance with one or more embodiments.

FIG. 9 is a system 900 that includes a headset 905, in accordance with one or more embodiments. The system 900 may operate in an artificial reality environment (e.g., a virtual reality environment, an augmented reality environment, a mixed reality environment, or some combination thereof). The system 900 shown by FIG. 9 includes the headset 905 and a client device 910 that is coupled to the network 920. While FIG. 9 shows an example system 900 including one headset 905 and one client device 910, in other embodiments any number of these components may be included in the system 900. For example, there may be multiple headsets each having an associated client device 910, with each headset and client device 910 communicating with the tracking device 500. In alternative configurations, different and/or additional components may be included in the system 900. Additionally, functionality described in conjunction with one or more of the components shown in FIG. 9 may be distributed among the components in a different manner than described in conjunction with FIG. 9 in some embodiments. For example, some or all of the functionality of the tracking device 500 may be provided by the headset 905.

The headset 905 includes the display assembly 930, an optics block 935, one or more position sensors 940, and the DCA 945. Some embodiments of headset 905 have different components than those described in conjunction with FIG. 9. Additionally, the functionality provided by various components described in conjunction with FIG. 9 may be differently distributed among the components of the headset 905 in other embodiments, or be captured in separate assemblies remote from the headset 905.

The display assembly 930 displays content to the user in accordance with data received from the console 915. The display assembly 930 displays the content using one or more display elements. A display element may be, e.g., an electronic display. In various embodiments, the display assembly 930 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof.

The optics block 935 may magnify image light received from the electronic display, corrects optical errors associated with the image light, and presents the corrected image light to one or both eyeboxes of the headset 905. In various embodiments, the optics block 935 includes one or more optical elements. Example optical elements included in the optics block 935 include: an aperture, a Fresnel lens, a convex lens, a concave lens, a filter, a reflecting surface, or any other suitable optical element that affects image light. Moreover, the optics block 935 may include combinations of different optical elements. In some embodiments, one or more of the optical elements in the optics block 935 may have one or more coatings, such as partially reflective or anti-reflective coatings.

Magnification and focusing of the image light by the optics block 935 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 935 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 935 corrects the distortion when it receives image light from the electronic display generated based on the content.

The position sensor 940 is an electronic device that generates data indicating a position of the headset 905. The position sensor 940 generates one or more measurement signals in response to motion of the headset 905. Examples of a position sensor 940 include: one or more IMUs, one or more accelerometers, one or more gyroscopes, one or more magnetometers, another suitable type of sensor that detects motion, or some combination thereof. The position sensor 940 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 905 from the sampled data. For example, the IMU integrates the measurement signals received from the accelerometers over time to estimate a velocity vector and integrates the velocity vector over time to determine an estimated position of a reference point on the headset 905. The reference point is a point that may be used to describe the position of the headset 905. While the reference point may generally be defined as a point in space, however, in practice the reference point is defined as a point within the headset 905.

The DCA 945 generates depth information for a portion of the local area. The DCA includes one or more imaging devices and a DCA controller. The DCA 945 may also include an illuminator.

The client device 910 may be a device that allows a user to send action requests and receive responses from the tracking device 500. An action request is a request to perform a particular action. For example, an action request may be an instruction to recalibrate a pose or gesture being tracked by the tracking device 500, or an instruction to receive user feedback of a correctly or incorrectly inferred pose or gesture. The client device 910 may include one or more input devices. Example input devices include: a keyboard, a mouse, a game controller, or any other suitable device for receiving action requests and communicating the action requests to the tracking device 500. An action request received by the client device 910 is communicated to the tracking device 500, which performs an action corresponding to the action request. In some embodiments, the client device 910 includes an IMU that captures calibration data indicating an estimated position of the client device 910 relative to an initial position of the client device 910. In some embodiments, the client device 910 may provide haptic feedback to the user in accordance with instructions received from the tracking device 500. For example, haptic feedback is provided when an action request is received, or the tracking device 500 communicates instructions to the client device 910 causing the client device 910 to generate haptic feedback when the tracking device 500 performs an action.

The tracking device 500 may provide content to the headset 905 or the client device 910 for processing in accordance with information received from one or more of: the DCA 945, the headset 905, and the client device 910. The tracking device 500 may provide data to the client device 910 for display or processing by the application 915. The application 915 may be dedicated to managing or controlling the tracking device 400. An application is a group of instructions, that when executed by a processor, generates content for presentation to the user. Examples of applications include: gaming applications, conferencing applications, video playback applications, or other suitable applications.

The network 920 couples the headset 905 and/or the client device 915 to the tracking device 500. The network 920 may include any combination of local area and/or wide area networks using both wireless and/or wired communication systems. For example, the network 920 may include the Internet, as well as mobile telephone networks. In one embodiment, the network 920 uses standard communications technologies and/or protocols. Hence, the network 920 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 920 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 920 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 900 may contain a privacy module that stores one or more privacy settings for user data elements. The user data elements describe the user or the headset 905. For example, the user data elements may describe a physical characteristic of the user, an action performed by the user, a location of the user of the headset 905, a location of the headset 905, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 900 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A tracking device integrated in a wrist wearable device, the tracking device comprising:
    a light source configured to illuminate a portion of a skin surface on a palm or a back of a user's hand;
    an optical sensor configured to capture images of the illuminated portion of the skin surface on the palm or the back of the user's hand, wherein physical properties of the skin surface on the palm or the back of the user's hand change in response to movements of fingers of the user's hand; and
    a controller configured to:
        receive, from the optical sensor, the captured images of the skin surface on the back or the palm of the user's hand; and
        infer a particular pose of the hand formed by the fingers of the user's hand by applying a model to the captured images of the skin surface on the palm or the back of the user's hand,
        wherein the model maps various physical property configurations of the skin surface on the palm or the back of the user's hand to different poses of the user's hand and applies optical flow to analyze pixel displacements of features of the skin surface over time across consecutive images to determine a likelihood that a pattern of displacement corresponds to the particular pose of the hand.

2. The tracking device of claim 1, wherein the controller is further configured to:
infer a gesture of the user's hand based in part on the model and the captured images, wherein the gesture is a sequence of poses of the user's hand over time.

3. The tracking device of claim 2, wherein the controller is further configured to:
infer the particular pose of the user's hand using the inferred gesture, wherein the captured images depict the sequence of poses of the user's hand over time, the sequence of poses chronologically preceding the particular pose of the user's hand.

4. The tracking device of claim 1, wherein the controller is further configured to:
determine a displacement of a point on the portion of the skin surface in the captured images, wherein the determined displacement includes at least one direction of displacement; and
apply the model to the determined displacement, wherein the model is a machine learned model configured to map skin displacement to the different poses of the body part user's hand.

5. The tracking device of claim 1, wherein the controller is further configured to:
determine a command corresponding to the particular pose of the user's hand; and
instruct a user device to perform an action in accordance with the command, wherein the user device is communicatively coupled with the tracking device.

6. The tracking device of claim 1, wherein the model is the optical flow model of skin displacement, the optical flow model defining patterns of motion of the portion of the skin relative to the optical sensor, each of the patterns mapping to the different poses of the hand.

7. The tracking device of claim 1, wherein the model is a skin feature model mapping skin features to the different poses of the user's hand, where skin features include surface patterns of the portion of the skin surface on the palm or the back of the user's hand.

8. The tracking device of claim 1, wherein the controller is further configured to:
receive a user request to create a user-defined pose associated with a user-defined command;
prompt the user to move the user's hand into the user-defined pose; capture training images of the user moving their body part the user's hand into the user:
defined pose; and
update the model using the captured training images and the user-defined pose.

9. The tracking device of claim 1, wherein the portion of the skin surface is selected from a group consisting of: a portion of skin around a joint of the user's finger, a portion of skin around fingertip of the user's finger, a portion of palmar skin of the user's hand, a portion of dorsal skin of the user's hand, the user's wrist, or some combination thereof.

10. A method comprising:
illuminating, by a light source of a tracking device integrated in a wrist wearable device, a portion of a skin surface on a palm or a back of a user's hand;
capturing, by an optical sensor of the tracking device, images of the illuminated portion of the skin surface on the palm or the back of the user's hand, wherein physical properties of the skin surface on the palm or the back of the user's hand change in response to movements of fingers of the user's hand; and
inferring, by a controller of the tracking device, a particular pose of the hand formed by the fingers of the user's hand by applying a model to the captured images of the skin surface on the palm or the back of the user's hand,
wherein the model maps various physical property configurations of the skin surface of the palm or the back of the user's hand to different poses of the user's hand and applies optical flow to analyze pixel displacements of features of the skin surface over time across consecutive images to determine a likelihood that a pattern of displacement corresponds to the particular pose of the hand.

11. The method of claim 10, further comprising:
inferring a gesture of the user's hand based in part on the model and the captured images, wherein the gesture is a sequence of poses of the user's hand over time.

12. The method of claim 11, further comprising:
inferring the particular pose of the user's hand using the inferred gesture, wherein the captured images depict the sequence of poses of the user's hand over time, the sequence of poses chronologically preceding the pose of the user's hand.

13. The method of claim 10, wherein inferring the pose of the user's hand based in part on the model and the captured images comprises:
determining a displacement of a point on the portion of the skin surface in the captured images, wherein the determined displacement includes at least one direction of displacement; and
applying the model to the determined displacement, wherein the model is a machine learned model configured to map skin displacement to the different poses of the user's hand.

14. The method of claim 10, further comprising:
determining a command corresponding to the particular pose of the user's hand; and
instructing a user device to perform an action in accordance with the command, wherein the user device is communicatively coupled with the tracking device.

15. A non-transitory computer-readable storage medium comprising stored instructions, the stored instructions when executed by a processor of a tracking device integrated in a wrist wearable device, cause the processor to:
cause a light source in the tracking device to illuminate a portion of g skin surface on a palm or a back of a user's hand;
cause an optical sensor in the tracking device to capture images of the illuminated portion of the skin surface on the palm or the back of the user's hand, wherein physical properties of the skin surface on the palm or the back of the user's hand change in response to movements of fingers of the user's hand; and
infer a particular pose of the hand formed by the fingers of the user's hand by applying a model to the captured images of the skin surface on the palm or the back of the user's hand,
wherein the model maps various physical property configurations of the skin surface on the palm or the back of the user's hand to different poses of the user's hand and applies optical flow to analyze pixel displacements of features of the skin surface over time across consecutive images to determine a likelihood that a pattern of displacement corresponds to the particular pose of the hand.

16. The non-transitory computer-readable storage medium of claim 15, further comprising stored instructions that when executed cause the processor to:
- infer a gesture of the user's hand based in part on the model and the captured images, wherein the gesture is a sequence of poses of the user's hand over time.

17. The non-transitory computer-readable storage medium of claim 16, further comprising stored instructions that when executed cause the processor to:
- infer the particular pose of the user's hand using the inferred gesture, wherein the captured images depict the sequence of poses of the user's hand over time, the sequence of poses chronologically preceding the particular pose of the user's hand.

18. The non-transitory computer-readable storage medium of claim 15, where the stored instructions to infer the particular pose of the user's hand further comprise stored instructions that when executed cause the processor to:
- determine a displacement of a point on the portion of the skin surface in the captured images, wherein the determined displacement includes at least one direction of displacement; and
- apply the model to the determined displacement, wherein the model is a machine learned model configured to map skin displacement to the different poses of the user's hand.

* * * * *